United States Patent
Ulbricht et al.

(10) Patent No.: US 8,240,444 B2
(45) Date of Patent: Aug. 14, 2012

(54) CONTROL DEVICE FOR A GEARBOX AND METHOD FOR CONTROLLING A GEARBOX

(75) Inventors: Markus Ulbricht, Tettnang (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 682 days.

(21) Appl. No.: 12/514,393

(22) PCT Filed: Nov. 5, 2007

(86) PCT No.: PCT/EP2007/061844
§ 371 (c)(1),
(2), (4) Date: May 11, 2009

(87) PCT Pub. No.: WO2008/058856
PCT Pub. Date: May 22, 2008

(65) Prior Publication Data
US 2010/0051408 A1    Mar. 4, 2010

(30) Foreign Application Priority Data
Nov. 16, 2006   (DE) .................. 10 2006 054 032

(51) Int. Cl.
*B60W 10/02* (2006.01)
*F16H 61/00* (2006.01)
*F16H 61/28* (2006.01)

(52) U.S. Cl. ..................... 192/3.58; 192/85.63; 192/221

(58) Field of Classification Search ................. 192/3.58, 192/85.63, 221
See application file for complete search history.

(56) References Cited

U.S. PATENT DOCUMENTS

| | | | | |
|---|---|---|---|---|
| 5,240,093 | A | * | 8/1993 | Wagner et al. ............... 192/3.58 |
| 5,571,226 | A | | 11/1996 | Kobayashi |
| 6,015,031 | A | * | 1/2000 | Dorfschmid et al. ........ 192/3.58 |
| 6,102,829 | A | * | 8/2000 | Muddell et al. ................ 477/77 |
| 6,223,533 | B1 | | 5/2001 | Schlaupitz |
| 6,694,803 | B2 | | 2/2004 | Klik et al. |
| 6,705,175 | B1 | * | 3/2004 | Klatt ............................... 74/335 |
| 7,703,478 | B2 | * | 4/2010 | Steinborn et al. ......... 137/596.17 |
| 8,078,370 | B2 | * | 12/2011 | Petzold et al. .................. 701/51 |
| 2008/0171633 | A1 | * | 7/2008 | Gansohr et al. ............... 477/175 |

FOREIGN PATENT DOCUMENTS

| | | |
|---|---|---|
| DE | 43 20 353 A1 | 1/1994 |
| DE | 199 31 973 A1 | 1/2001 |
| DE | 10 2005 015 911 A1 | 10/2006 |
| EP | 0 648 900 A2 | 4/1995 |
| EP | 0 802 356 A2 | 10/1997 |
| EP | 1 270 954 A2 | 1/2003 |
| WO | 98/13627 A1 | 4/1998 |

* cited by examiner

*Primary Examiner* — David D Le
*Assistant Examiner* — Huan Le
(74) *Attorney, Agent, or Firm* — Davis & Bujold, P.L.L.C.

(57) ABSTRACT

A control device for and a method of controlling a gearbox having a pressure-limiting device connected to a pressure medium source. A first controllable valve device is connected downstream of the pressure-limiting device and an actuating device is connected further downstream and adjusts the gearbox. A second controllable valve device is connected directly to the pressure medium source, via a supply line, and another actuating device is connected downstream of the second controllable valve device. An electric control device is provided for actuating the controllable valve devices and a sensor is connected to the electric control device for measuring pressure of the pressure medium in the supply line. The electric control device is connected to the second controllable valve device such that the second controllable valve device and the further actuating device are controlled by the pressure of the pressure medium in the supply line.

20 Claims, 1 Drawing Sheet

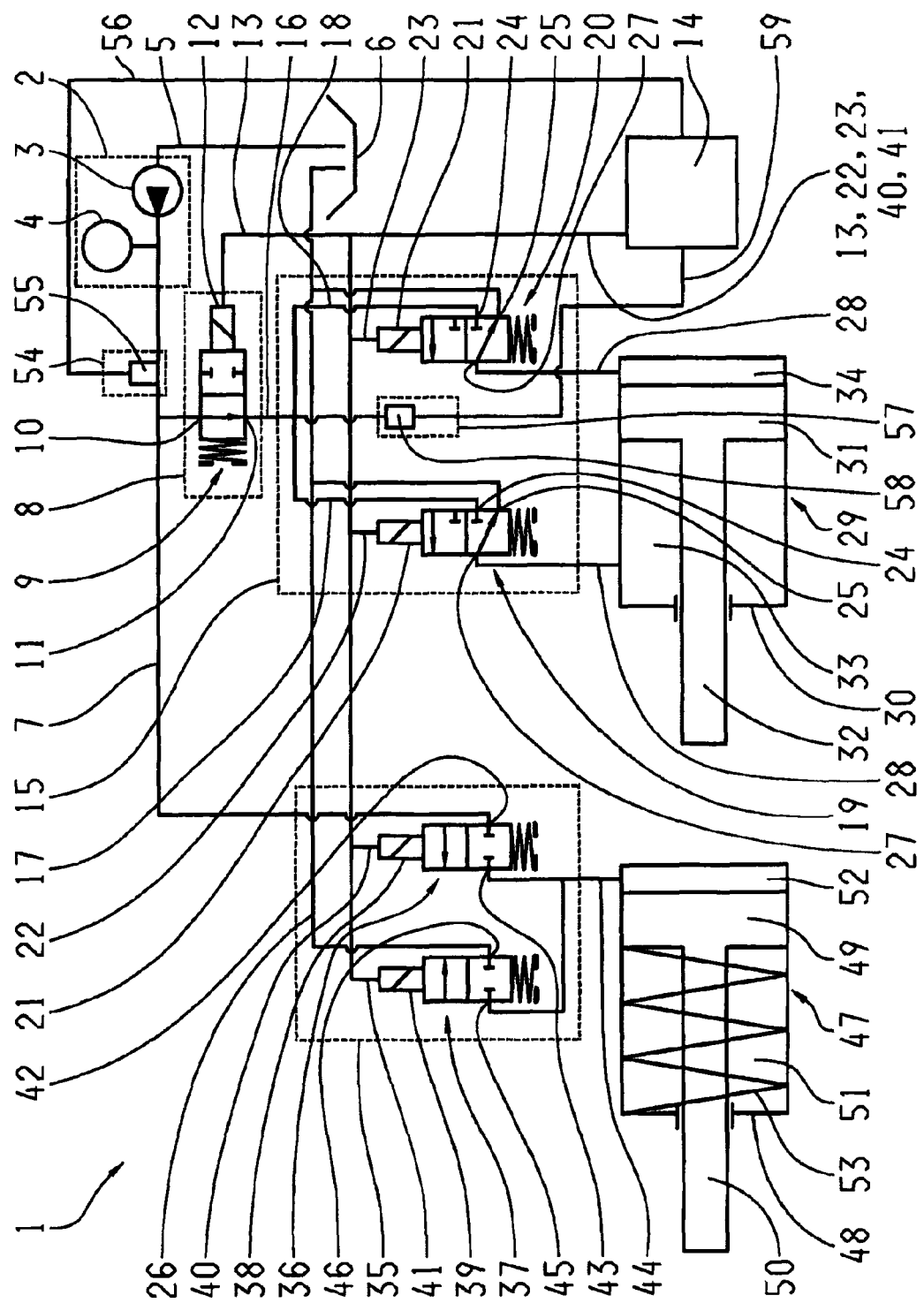

CONTROL DEVICE FOR A GEARBOX AND METHOD FOR CONTROLLING A GEARBOX

This application is a National Stage completion of PCT/EP2007/061844 filed Nov. 5, 2007, which claims priority from German patent application serial no. 10 2006 054 032.8 filed Nov. 16, 2006.

FIELD OF THE INVENTION

The present invention relates to a control device for a gearbox featuring a pressure medium source, a pressure-limiting device connected to the pressure medium source downstream, at least one first controllable valve device connected downstream to the pressure-limiting device, and at least one actuating device connected downstream to the first controllable valve device, at least one second controllable valve device, which is connected via a supply line directly to the pressure medium source, and at least one further actuating device connected downstream to the second controllable valve device, an electric control device to actuate the first and second controllable valve device, and a sensor device connected to the electric control device to measure the pressure of the pressure medium in the supply line. The present invention further relates to a method of controlling the gearbox.

BACKGROUND OF THE INVENTION

A device of this type for controlling a gearbox is known from DE 199 31 973 A1. The known control device includes a pressure medium source, which is connected to a pressure limiting valve via a supply line. A first controllable valve device is connected to the pressure limiting valve, and is followed again by an actuating device to adjust the gearbox. The first controllable valve device includes two 3/2-way valves, which on one side are connected to the pressure limiting valve and on the other to the actuating device to adjust the gearbox. The pressure limiting valve as well as the first controllable valve device is actuated as a function of the pressure in the lines between the pressure-limiting valve on the one side and the 3/2-way valves on the other. In order to ascertain this pressure, the indicated document suggests arranging a pressure sensor inside the pressure medium line extending from the pressure-limiting valve to the first controllable valve device. Further, a second controllable valve device is provided, which serves to control a further actuating device. The second controllable valve device is connected directly to the pressure medium source, whereby this is again via the above-mentioned supply line. A further pressure sensor is provided in the supply line and serves to monitor the supply pressure. The pump allocated to the pressure medium source is actuated on the basis of the supply pressure ascertained, so that a constant supply pressure is assured inside the supply lines.

SUMMARY OF THE INVENTION

Proceeding from this state of the art, the object of the present invention is to create a control device for a gearbox which allows especially simple and assured control or regulation of the further actuating device, whereby the structure of the control device must be especially simple. Further, it is the object of the present invention to provide an especially simple method of controlling a gearbox, which in particular provides assured control and regulation of the further actuating device.

The control device, in accordance with the invention, for a gearbox features first of all a pressure medium source. A pressure medium source can be understood, for example, as a pump in combination with a pressure medium storage device. The pressure medium can be air or oil, for example, so that this can be a pneumatic or a hydraulic device. A pressure-limiting device connected to the pressure medium source is provided downstream from the pressure medium. Here and below, downstream means that the pressure medium flows in this direction to an actuating device in order to effect adjustment there. Downstream of the pressure-limiting device is a first controllable valve device, which is connected to the former. The first controllable valve device can comprise several valves, for example. Further, at least one actuating device, connected downstream to the first controllable valve device is provided to adjust the gearbox. The actuating device to adjust the gearbox can be a double-action cylinder, for example, whose pressure chambers are connected to the valves of the first controllable valve device. The control device for a gearbox further features at least one second controllable valve device, which is connected directly to the pressure medium source via a supply line. This means that the second controllable valve device is not downstream of the pressure-limiting device, as is the case with the first controllable valve device. Downstream of the second controllable valve device is a further actuating device, which is connected to the second controllable valve device. The further actuating device can for example be an actuating device of a clutch associated with the gearbox, or an actuating device for a gear brake. Further, an electric control device to actuate the first and second controllable valve device is provided. Further, a sensor device is connected to an electric control device to measure the pressure of the pressure medium in the supply line. In accordance with the invention, the electric control device is actively connected to the second controllable valve device in such a way that the second controllable valve device and thus the further actuating device can be actuated as a function of the pressure of the pressure medium measured in the supply line.

Thus in accordance with the invention, the pressure of the pressure medium in the supply line is not only ascertained, but this ascertained pressure is also the basis for control of the second controllable valve device, and hence of the further actuating device. Thus the invention allows better adaptive controllability of the second controllable valve device and hence of the further actuating device. This is especially advantageous when the actuating device is a clutch actuating device and/or a gear brake actuating device.

In a preferred embodiment of the control device in accordance with the invention, the actuating device, which is connected to the second controllable valve device, is a clutch actuating device and/or a gear brake actuating device. The first actuating device is thus an actuating device for a clutch associated with the gearbox, and/or an actuating device for a gear brake associated with the gearbox. In the case of a gear brake actuating device, therefore, for the first time good adaptive controllability of the gear brake is also possible.

In a further preferred embodiment of the control device in accordance with the invention, a second sensor device connected to the electric control device downstream behind the pressure-limiting device measures the pressure of the pressure medium. The electric control device is actively connected to the first controllable valve device in such a way that the first controllable valve device and hence the actuating device for adjusting the gearbox can be actuated as a function of the measured pressure of the pressure medium behind the pressure-limiting device. The second sensor device to measure the pressure of the pressure medium can again include a pressure sensor, for example, which measures the pressure inside the pressure line between the pressure-limiting device on one side and the actuating device for adjusting the gearbox on the other.

In a further preferred embodiment of the control device in accordance with the invention, the pressure-limiting device can be actuated by the electric control device as a function of the pressure of the pressure medium measured behind the pressure-limiting device. Thus the pressure-limiting device can be formed by a pressure limiting valve, for example, which is operated by a pulse-width-modulated signal from the electric control device to produce various pressures behind the pressure-limiting device.

In a further preferred embodiment of the control device in accordance with the invention, the pressure-limiting device is a pressure-limiting valve.

In an especially preferred embodiment of the control device in accordance with the invention, the further actuating device is a clutch actuating device. A pressure medium feed line is provided between the second controllable valve device and the clutch actuating device. In this embodiment, no check valve is provided inside the pressure medium feed line. Thanks to actuation of the second controllable valve device based on the ascertained pressure medium pressure in the supply line, a check valve can be dispensed with in the pressure medium feed line. Thus, the second controllable valve device can be closed, for example, when a pressure drop is measured in the supply line, so that backflow of the pressure medium into the supply line is prevented even when no control device is provided in the pressure medium feed line. In this way, an especially simple structure of the control device in accordance with the invention is achieved.

For the above-mentioned reasons, in an advantageous embodiment of the electric control device in accordance with the invention, the electric control device is actively connected to the second controllable valve device in such a way that the pressure medium cannot flow back from the pressure medium feed line into the supply line when the measured pressure of the pressure medium in the supply line goes below a set minimal value. As already explained above, solely through actuation of the valves of the second controllable valve device, maintenance of pressure inside the pressure medium feed line can be assured without an expensive check valve being required.

The method in accordance with the invention for controlling a gearbox includes the method steps indicated below: Preparation of a control device for a gearbox with a pressure medium source, a pressure-limiting device connected downstream to the pressure medium source, at least one first controllable valve device connected downstream to the pressure-limiting device, and at least one actuating device connected downstream to the first controllable valve device to adjust the gearbox, at least one second controllable valve device which is connected, via a supply line, directly to the pressure medium source, and at least one further actuating device connected downstream to the second controllable valve device; measurement of the pressure medium pressure in the supply line and actuation of the second controllable valve device and thus the further actuating device as a function of the measured pressure medium pressure in the supply line. With regard the advantages of the method in accordance with the invention, reference is made to the indicated advantages of the control device in accordance with the invention.

In a preferred embodiment of the method in accordance with the invention, the control device for a gearbox features as a further actuating device a clutch actuating device and/or a gear brake actuating device.

Further, an especially preferred embodiment of the method in accordance with the invention includes the method steps measurement of the pressure of the pressure medium downstream behind the pressure-limiting device and actuation of the first controllable valve device and thus of the actuating device to adjust the gearbox as a function of the measured pressure of the pressure medium downstream behind the pressure-limiting device.

In an advantageous embodiment of the method in accordance with the invention, further, the method step of actuating the pressure-limiting device as a function of the measured pressure of the pressure medium downstream behind the pressure-limiting device is provided.

In a further advantageous embodiment of the method in accordance with the invention, further, the method step of actuating the second controllable valve device is conducted in such a way that the pressure medium cannot flow back from the further actuating device into the supply line when the measured pressure of the pressure medium in the supply line goes below a set minimal value. Thus for example, when there is a pressure drop in the supply line, the second controllable valve device can be actuated in such a way that it is closed and thus prevents backflow.

BRIEF DESCRIPTION OF THE DRAWING

The invention is explained in more detail below with reference to an exemplary embodiment and the associated drawing. The single drawing shows a schematic representation of an embodiment of the control device for a gearbox in accordance with the invention.

DETAILED DESCRIPTION OF THE PREFERRED EMBODIMENTS

The single drawing shows a schematic representation of an embodiment of the control device 1 for a gearbox in accordance with the invention. The control device 1 features first of all a pressure medium source 2, which includes both a pressure medium pump 3 and a pressure medium storage device 4. The pressure medium can be air or oil, for example. The pressure medium pump is connected at its suction end to the pressure medium line 5, whose end extends into a pressure medium drain 6. A supply line 7 is connected to the other end of the pressure medium pump 3, which is also provided with the pressure medium storage device 4.

Downstream of the pressure medium source 2, a pressure-limiting device 8 is provided, which is connected to the supply line 7 and thus to the pressure medium source 2. The pressure-limiting device 8 includes in the present example a pressure limiting valve 9, which is configured as a 2/2-way valve. The pressure limiting valve 9 here has a pressure medium inlet 10, which is connected to the supply line 7, and a pressure medium outlet 11. The control of the pressure limiting valve 9, which is configured as a magnetic valve, takes place by means of an electromagnet 12 which is connected via a control line 13 to an electric control device 14, which is explained in more detail below. Downstream of the pressure-limiting device 8, a first controllable valve device 15 is connected to the pressure-limiting device 8. For this purpose, a further pressure medium line 16 is connected to the pressure medium outlet 11 of the pressure limiting valve 9, and then splits into two further pressure medium lines 17 and 18.

The first controllable valve device here includes a first 3/2-way valve 19 and a second 3/2-way valve 20, whereby the pressure medium line 17 leads to the first 3/2-way valve configured as a magnetic valve, and the pressure medium 18 to the second 3/2-way valve configured as a magnetic valve. The two 3/2-way valves 19 and 20 can again be actuated via an electromagnet 21, 22, which is connected via a control line 22, 23 to the electric control device 14. Each of the two valves 19 and 20 features a pressure medium inlet 24, which is connected in the case of the valve 19 to the pressure medium line 17, and in the case of the valve 20 to the pressure medium line 18. Further, each valve 19, 20 features a pressure medium output 25, which is connected via a compound outlet line 26 to the pressure medium drain 6. The valves 19, 20 further feature a pressure medium outlet 27, which leads via further pressure medium lines 28 to a downstream actuating device 29.

The actuating device 29 includes a double-action cylinder 30, in which a movable piston 31 is disposed. A piston rod 32 is coupled to the movable piston 31, projects from the cylinder 30, and is thus suited as an actuating element for adjusting the gearbox. The piston 31 divides the interior space inside the cylinder 30 into a first pressure medium chamber 33 and a second pressure medium chamber 34. Here the first pressure medium chamber 33 is connected, via the pressure medium line 28, to the pressure medium outlet 27 of the first valve 19, while the second pressure medium chamber 34 is connected via the pressure medium line 28 to the pressure medium outlet 27 of the second valve 20. In order to fill or empty the pressure medium chambers 33, 34 with pressure medium, only the two valves 19, 20 and the pressure limiting valve 9 have to be accordingly actuated by the electric control device 14 via the control lines 13, 22, and 23.

The control device 1 further features a second controllable valve device 35. The second controllable valve device 35 is connected via the supply line 7 directly to the pressure medium source 2, that is, the second controllable valve device 35 is not provided downstream of the pressure-limiting device 8, but is supplied with pressure medium from the supply line 7. This medium is under pressure corresponding to the supply pressure of the pressure medium source 2, and is not reduced by the pressure-limiting device.

The second controllable valve device 35 includes a first valve 36 and a second valve 37, whereby both valves are configured as 2/2-way valves and can be activated by means of the electromagnets 38 and 39. The electromagnets 38, 39 are again actuated by means of the control lines 40, 41, which lead to the electric control device 14. The pressure medium inlet 42 of the first valve 36 is connected directly to the supply line 7, while the pressure medium outlet 43 of the first valve 36 is connected to a pressure medium feed line 4. The pressure medium inlet 45 of the second valve 37 is again connected to the pressure medium feed line 44, whereas the pressure medium outlet 46 of the second valve 37 is connected to the outlet line 26, which leads to the pressure medium drain 6. Downstream of the second controllable valve device 35, a further actuating device 47 is provided, which is connected via the pressure medium feed line 44 to the second controllable valve device 35.

The further actuating device 47 is configured in the present embodiment as an actuating device for a clutch (not shown) or an actuating device for a gear brake (not shown). Preferably, still further actuating devices of this type are provided which then are actuated by the particular further second controllable valve devices. The actuating device 47 features a cylinder 48 in which a piston 49 is guided. Further a piston rod 50 is disposed on the piston 49, the rod projecting from the cylinder 48 and serving as an actuating element for the clutch or the gear brake. The piston 49 divides the interior space of the cylinder 48 into a chamber 51 and a pressure medium chamber 52. Here the piston is prestressed by means of a spring 53 in the direction of the pressure medium chamber 52. The pressure medium feed line 44, which in the present case removes the pressure medium, empties into the pressure medium chamber 52.

The control device 1 further features a first sensor device 54 for measurement of the pressure medium pressure in the supply line 7. In the present example, the sensor device 54 comprises a pressure sensor 55, which is connected, via a measurement line 56, to the electric control device 14. Further, a second sensor device to measure the pressure of the pressure medium is provided, which measures the pressure of the pressure medium at the branch point between the pressure medium line 16 on one side, and the pressure medium lines 17 and 18 on the other. The second sensor device 57 again features a pressure sensor 58, which is connected by means of a measurement line 59 to the electric control device 14.

The electric control device 14 is actively connected, via the control lines 40, 41, to the second controllable valve device 35, that is, to the first and second valve 36, 37, in such a way that the second controllable valve device 35 and thus the further actuating device 47 can be actuated as a function of the measured pressure medium pressure in the supply line 7. For example, if the pressure dominating in the supply line 7 should drop below a set minimal value, which could be caused by a leak, for example, this is detected by means of the pressure sensor 55 of the first sensor device 54, and is transmitted, via the measurement line 56, to the electric control device 14. The electric control device 14 can then act, via the control lines 40, 41, on the first and second valve 36, 37 of the second controllable valve device 35 in such a way that the valves 36, 37 are set in the closed position as indicated in the drawing. With this setting, the pressure medium cannot flow back from the pressure medium chamber 52 of the further actuating device 47 via the pressure medium feed line to the supply line 7 or the outlet line 26. The pressure in the pressure medium chamber 52 can thus be maintained without the need for a check valve in the pressure feed line, so that such a check valve can be dispensed with in the shown embodiment.

Further, the electric control device 14 is actively connected via the control lines 22, 23, to the first controllable valve device 15 such that the latter and thus also the actuating device 29 can be actuated to adjust the gearbox as a function of the pressure of the pressure medium measured by the second sensor device 57. Also, the pressure-limiting device 8 or its pressure limiting valve 9 can be actuated, via the control line 13, by the electric control device 14 as a function of the pressure of the pressure medium ascertained by the pressure sensor 58. Thus for example, the pressure limiting valve 9 can be acted on by a pulse-width-modulated signal from the electric control device so that the pressure of the pressure medium is reduced in the downstream pressure medium line 16 with respect to the supply pressure in the supply line 7.

REFERENCE NUMERALS

1. Control device
2. Pressure medium source
3. Pressure medium pump
4. Pressure medium storage device
5. Pressure medium line
6. Pressure medium drain
7. Supply line
8. Pressure-limiting device
9. Pressure limiting valve
10. Pressure medium inlet
11. Pressure medium outlet 12. Electromagnet
13. Control line
14. Electric control device
15. First controllable valve device
16. Pressure medium line
17. Pressure medium line
18. Pressure medium line
19. 3/2-way valve
20. 3/2-way valve
21. Electromagnet
22. Control line
23. Control line
24. Pressure medium inlet
25. Pressure medium output
26. Outlet line
27. Pressure medium outlet
28. Pressure medium line
29. Control device to adjust the gearbox
30. Double-action cylinder
31. Piston
32. Piston rod/actuating element
33. First pressure medium chamber
34. Second pressure medium chamber
35. Second controllable valve device
36. First valve
37. Second valve
38. Electromagnet
39. Electromagnet
40. Control line
41. Control line
42. Pressure medium inlet
43. Pressure medium outlet
44. Pressure medium feed line
45. Pressure medium inlet
46. Pressure medium outlet
47. Further actuating device
48. Cylinder
49. Piston
50. Piston rod
51. Chamber
52. Pressure medium chamber
53. Spring
54. First sensor device
55. Pressure sensor
56. Measurement line
57. Second sensor device
58. Pressure sensor
59. Measurement line

The invention claimed is:

1. A control device for a gearbox comprising:
a pressure medium source (2);
a pressure-limiting device (8) connected to the pressure medium source (2) downstream therefrom;
at least one first controllable valve device (15) connected to the pressure-limiting device (8) downstream therefrom, and at least one actuating device (29) connected to the first controllable valve device (15) downstream therefrom for adjusting the gearbox;
at least one second controllable valve device (35), which is directly connected, via a supply line (7), to the pressure medium source (2), and at least one further actuating device (47) connected to the second controllable valve device (35) downstream therefrom;
an electric control device (14) for actuating the first and second controllable valve device (15, 35);
a sensor device (54) connected to the electric control device (14) for measuring a pressure of pressure medium in the supply line (7);
the electric control device (14) being actively connected to the second controllable valve device (35) such that the second controllable valve device (35) and the further actuating device (47) are controllable as a function of a measurement of the pressure of the pressure medium in the supply line (7) generated by the sensor device (54).

2. The control device in accordance with claim 1, wherein the further actuating device (47) is one of a clutch actuating device and a gear brake actuating device.

3. The control device in accordance with claim 1, wherein the pressure-limiting device (8) is a pressure limiting valve (9).

4. The control device in accordance with claim 1, wherein the pressure medium feed line is free of any check valve.

5. The control device in accordance with claim 1, wherein a second sensor device (57) is connected to the electric control device (14) and is provided downstream of the pressure-limiting device (8) for measuring the pressure of the pressure medium, the electric control device (14) is actively connected to the first controllable valve device (15) such that the first controllable valve device (15) and the actuating device (29) are controllable as a function of a measurement of the pressure of the pressure medium downstream of the pressure-limiting device (8) and controllably adjust the gearbox.

6. The control device in accordance with claim 5, wherein the pressure-limiting device (8) is also controllable by the electric control device (14) as a function of the measurement of the pressure of the pressure medium downstream of the pressure-limiting device (8).

7. The control device in accordance with claim 1, wherein the further actuating device (47) is a clutch actuating device, and a pressure medium feed line (44) connects the second controllable valve device (35) and the clutch-actuating device without any check valve provided therebetween.

8. The control device in accordance with claim 7, wherein the electric control device (14) is actively connected to the second controllable valve device (35) such that the pressure medium is restricted from flowing back from the pressure medium feed line (44) into the supply line (7) when the measurement of the pressure of the pressure medium in the supply line (7) is below a set minimal value.

9. The control device in accordance with claim 1, wherein the further actuating device is a piston and cylinder, and the piston is prestressed via a spring.

10. The control device in accordance with claim 9, wherein the piston divides an interior space of the cylinder into a pressure medium chamber and a non-pressure medium chamber.

11. The control device in accordance with claim 1, wherein the second controllable valve device comprises first and second 2/2 way valves.

12. The control device in accordance with claim 11, wherein both of the first and the second 2/2 way valves are biased in a closed position.

13. The control device in accordance with claim 11, wherein only one of the first and the second 2/2 way valves is directly connected to the supply line.

14. The control device in accordance with claim 11, wherein only one of the first and the second 2/2 way valves being directly connected to the pressure medium drain.

15. The control device in accordance with claim 11, wherein the control device includes a plurality of second controllable valve devices.

16. A method of controlling a gearbox, the method comprising the steps of:

preparing a control device for a gearbox with a pressure medium source, a pressure-limiting device connected to the pressure medium source downstream therefrom, at least one first controllable valve device connected to the pressure-limiting device downstream therefrom and at least one actuating device connected to the first controllable valve device downstream therefrom to adjust the gearbox, at least one second controllable valve device, which is connected via a supply line directly to the pressure medium source, and at least one further actuating device connected to the second controllable valve device downstream therefrom;

measuring a pressure of the pressure medium in the supply line and generating a measurement; and actuating the second controllable valve device and thus the further actuating device as a function of the measurement of the pressure of the pressure medium in the supply line.

17. The method in accordance with claim 16, further comprising the step of providing at least one of a clutch actuating device and a gear brake actuating device as the further actuating device of the control device for a gearbox.

18. The method in accordance with claim 16, further comprising the step of actuating the second controllable valve device such that the pressure medium is prevented from flowing from the further actuating device into the supply line when the measurement of the pressure of the pressure medium in the supply line is below a set minimal value.

19. The method in accordance with claim 16, further comprising the steps of:

measuring pressure of the pressure medium downstream behind the pressure-limiting device and generating a measurement; and actuating the first controllable valve device and thus the actuating device to adjust the gearbox as a function of the measurement of the pressure of the pressure medium downstream behind the pressure-limiting device.

20. The method in accordance with claim 19, further comprising the step of actuating the pressure-limiting device as a function of the measurement of the pressure of the pressure medium downstream behind the pressure-limiting device.

\* \* \* \* \*